Aug. 21, 1945.  J. E. SMITH  2,383,351

PHASE INVERTER CIRCUIT

Filed Feb. 27, 1943

INVENTOR
JAMES E. SMITH
BY H. S. Grover
ATTORNEY

Patented Aug. 21, 1945

2,383,351

UNITED STATES PATENT OFFICE 2,383,351

PHASE INVERTER CIRCUIT

James Ernest Smith, Jackson Heights, N. Y., assignor to Radio Corporation of America, a corporation of Delaware Application February 27, 1943, Serial No. 477,484

2 Claims. (Cl. 178—44)

The present invention relates to a phase inverter circuit which is adapted to couple a single ended or unbalanced circuit to a push-pull or balanced circuit for any frequency down to and including D. C.

It is common practice to use transformer coupling between the output of a preceding single tube amplifier or detector stage and the input to a succeeding push-pull stage, because this form of coupling enables the application of equal voltages to the control grids of the push-pull tubes but in phase opposition. It is also known, in order to avoid the use of transformer coupling, to utilize resistance-capacity coupling, and for obtaining the necessary phase opposition on the push-pull grids there is employed an auxiliary tube known as a phase reversing tube. A circuit embodying the last named suggestion is disclosed in the Gorton U. S. Patent 1,654,075.

The above and other phase inverter circuits are arranged for A. C. coupling only. According to the present invention the push-pull input is coupled both for A. C. and D. C. to the preceding or driver stage. The circuit operates as a straight-forward cathode coupled stage insofar as one polarity of the push-pull input is concerned. The opposite polarity is obtained by means of a voltage divider in the plate circuit of the driver stage. The circuit elements are arranged so that the output for the push-pull stage develops equal D. C. voltages and equal A. C. voltages with respect to ground.

It is one of the main objects of the present invention to provide an improved circuit arrangement wherein not only is the use of transformer coupling avoided, but the phase reversing tube is also dispensed with in the coupling of a single tube stage to a push-pull amplifier stage.

Another object of the invention is to provide a coupling network between an unbalanced and a balanced circuit which will feed to the latter equal incremental D. C. voltage changes as well as equal A. C. voltages.

Another object is to provide a simplified phase inverter circuit that will operate efficiently for any frequency down to and including D. C., so that very low excitation frequencies may be transmitted without the use of the usual capacitor coupling with its deleterious amplitude and phase versus frequency characteristics.

Figure 2:
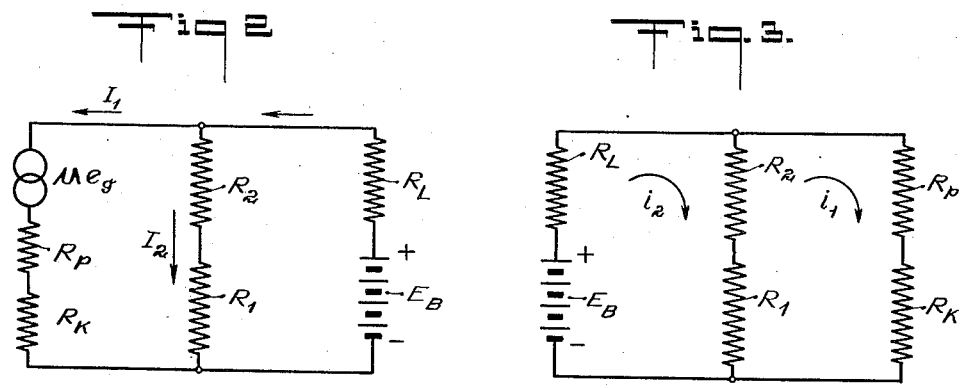
Figure 3:
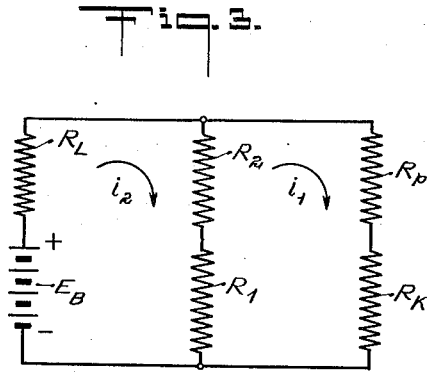
Figure 4:
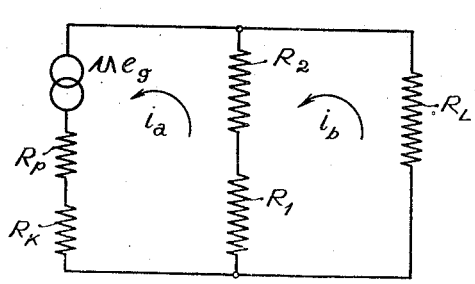

Other objects and advantages of the invention will become apparent to those skilled in the art as the description thereof proceeds. For a better understanding of the invention however, reference is made to the following specification taken in connection with the accompanying drawing wherein Fig. 1 discloses the phase inverter circuit according to the invention, Fig. 2 is an equivalent electrical circuit, and Figs. 3 and 4 are respectively the equivalent D. C. and A. C. circuits of that disclosed in Fig. 1.

Figure 1:
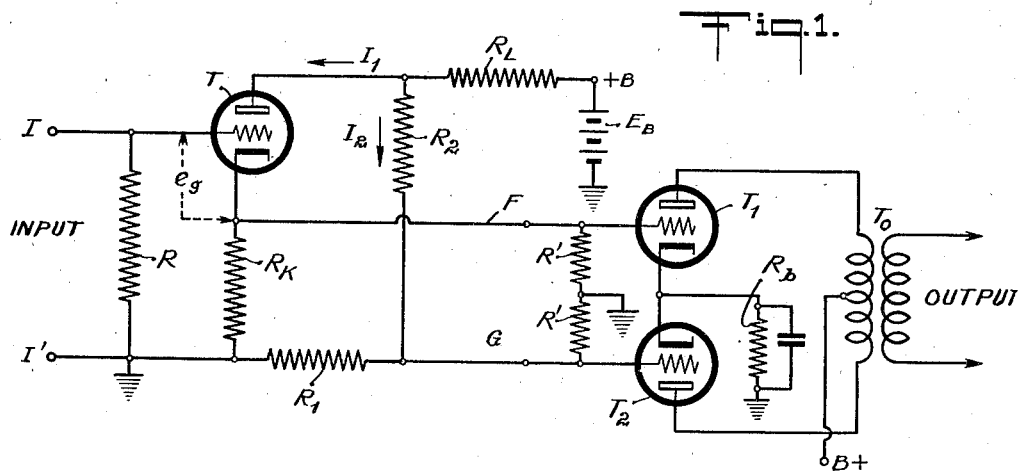

Referring to Fig. 1, tube T is a single ended stage and tubes $T_1$ and $T_2$ constitute a push-pull stage. Incoming signals are applied between the input terminals I, I' which are connected respectively to the signal control grid of tube T and to ground. R is the usual grid leak resistor which is connected between the signal grid and ground. A cathode resistor $R_K$ is connected between cathode and ground, the cathode end of the resistor serving as one polarity of the push-pull output voltage. The anode of tube T is connected to the positive terminal +B of a source of energy, such as the battery $E_b$ or other suitable source, through a load resistor $R_L$. A voltage divider comprising the resistors $R_2$ and $R_1$ is connected between the anode of tube T and the grounded end of cathode resistor $R_K$, the common terminal between $R_2$ and $R_1$ serving as the other polarity of the push-pull output voltage. The signal control grids of the push-pull tubes $T_1$ and $T_2$ are connected directly to the terminals of opposite polarity above described by way of the leads F and G. Suitable means such as the resistor-condenser combination $R_b$ connected between the cathodes of the tubes $T_1$ and $T_2$ and ground may be utilized as a source of grid bias for said tubes. R' and R' are the usual grid leak resistors of large value compared to $R_K$ and $R_1$. A transformer $T_0$ may be used to derive the output from the push-pull stage.

For simplicity of illustration the several tubes are shown as triodes, although it will be understood that tetrodes, pentodes, or other equivalents may be used equally as well.

The necesary circuit element relationships for obtaining the desired equal D. C. and A. C. voltages are determined analytically in the following manner. Fig. 2 is the equivalent electrical circuit of Fig. 1. By the principle of superposition, we can consider the A.-C. and D.-C. voltages as acting separately.

For the D.-C. case, we have the equivalent circuit of Fig. 3. It is required that the cathode D.-C. voltage equal that across $R_1$, i. e., the boundary condition is $$R_1(i_2-i_1) = i_1 R_k$$

or $$\frac{i_2}{i_1} = \frac{R_1+R_k}{R_1}$$

(Boundary condition #1)

Now from the circuit we have $$i_2(R_L+R_1+R_2) - i_1(R_1+R_2) = E_B$$
$$-i_2(R_1+R_2) + i_1(R_1+R_2+R_p+R_k) = 0$$

Solving for the ratio $$\frac{i_2}{i_1}$$

gives $$\frac{i_2}{i_1} = \frac{R_1+R_2+R_p+R_k}{R_1+R_2}$$

Substituting Boundary condition #1 gives $$\frac{R_p}{R_k} = \frac{R_2}{R_1} \quad \text{(Equation \#1)}$$

For the A.-C. case, the equivalent circuit is as shown in Fig. 4. It is now required that $$i_a R_k = R_1(i_a - i_b)$$

or $$\frac{i_b}{i_a} = \frac{R_1 - R_k}{R_1} \quad \text{(Boundary condition \#2)}$$

From the circuit we have $$i_a(R_p+R_k+R_1+R_2) - i_b(R_1+R_2) = \mu e_g$$
$$-i_a(R_1+R_2) + i_b(R_1+R_2+R_L) = 0$$

giving $$\frac{i_b}{i_a} = \frac{R_1+R_2}{R_1+R_2+R_L}$$

Substituting Boundary condition 2 gives $$\frac{R_k}{R_1} = \frac{R_L}{R_1+R_2+R_L} \quad \text{(Equation \#2)}$$

As a typical example, if we let $$R_1 = 2R_k$$

then the values of $R_2$ and $R_L$ that will satisfy Equations #1 and #2 will be as follows:

$$R_2 = 2R_p$$

and $$R_L = 2(R_p+R_k)$$

In other words, for the example given and using a tube having a D. C. plate resistance equal to $R_p$, the resistance $R_2$ will be twice $R_p$, $R_1$ will be twice $R_k$, and the plate load resistor $R_L$ will be twice the sum of $R_p$ and $R_k$ or equal to the sum of $R_1$ and $R_2$.

While I have shown and described a preferred embodiment of my invention, it will be understood that various modifications and changes will occur to those skilled in the art without departing from the spirit and scope of this invention. I therefore contemplate by the appended claims to cover any such modifications as fall within the true spirit and scope of my invention.

What I claim is:

1. In combination, an electron discharge tube provided with a grid, an anode, and a cathode and having a D. C. plate resistance of value $R_p$, a resistor of value $R_k$ connected between cathode and ground, a pair of resistances of values $R_2$ and $R_1$ respectively connected between anode and ground, a resistor of value $R_L$ connected between the anode and a source of positive potential, said values satisfying each of the following equations $$\frac{R_p}{R_k} = \frac{R_2}{R_1}$$

$$\frac{R_k}{R_1} = \frac{R_L}{R_1+R_2+R_L}$$

whereby there is developed at the cathode end of the resistor $R_k$ and at the common terminal between $R_1$ and $R_2$ equal A. C. and equal D. C. voltages but of opposite polarities.

2. The invention defined in claim 1 wherein a pair of push-pull tubes are coupled to said electron discharge tube both for A. C. and D. C. by conductive connections from the grids of said push-pull tubes to respectively the cathode end of resistor $R_k$ and the common terminal between resistances $R_1$ and $R_2$.

J. ERNEST SMITH.